(12) United States Patent
Masten (10) Patent No.: US 9,918,457 B2
(45) Date of Patent: Mar. 20, 2018

(54) REEL LINE SPOOLER

(71) Applicant: James L Masten, Houston, TX (US)

(72) Inventor: James L Masten, Houston, TX (US)

( * ) Notice: Subject to any disclaimer, the term of this patent is extended or adjusted under 35 U.S.C. 154(b) by 181 days.

(21) Appl. No.: 14/891,070

(22) PCT Filed: May 8, 2014

(86) PCT No.: PCT/US2014/037314
§ 371 (c)(1),
(2) Date: Nov. 13, 2015

(87) PCT Pub. No.: WO2014/186211
PCT Pub. Date: Nov. 20, 2014

(65) Prior Publication Data
US 2016/0088822 A1    Mar. 31, 2016

Related U.S. Application Data

(60) Provisional application No. 61/824,828, filed on May 17, 2013.

(51) Int. Cl.
| A01K 89/00 | (2006.01) |
| B65H 75/22 | (2006.01) |
| B65H 75/06 | (2006.01) |
| B65H 75/24 | (2006.01) |
| A01K 89/012 | (2006.01) |
| B65H 54/44 | (2006.01) |
| A01K 89/017 | (2006.01) |

(52) U.S. Cl.
CPC .......... *A01K 89/003* (2013.01); *A01K 89/012* (2013.01); *A01K 89/017* (2013.01); *B65H 54/44* (2013.01); *B65H 75/06* (2013.01); *B65H 75/22* (2013.01); *B65H 75/24* (2013.01)

(58) Field of Classification Search
CPC ........ B65H 75/06; B65H 75/22; B65H 75/24; B65H 54/44; A01K 89/003
See application file for complete search history.

(56) References Cited

U.S. PATENT DOCUMENTS

| 4,196,864 A | 4/1980 | Cole |
| 4,728,048 A | 3/1988 | Batson |
| 4,948,059 A | 8/1990 | Lewitt |
| 4,951,890 A | 8/1990 | Sossamon |
| 4,962,901 A | 10/1990 | Shirley |
| 5,218,779 A | 6/1993 | Morgan et al. |
| 6,015,111 A | 1/2000 | Berke |
| 6,102,319 A | 8/2000 | Annabel |
| 6,260,785 B1 | 7/2001 | Prais |
| 6,398,147 B1 | 6/2002 | Frederickson |
| 6,427,377 B1 | 8/2002 | Kim |
| 6,457,665 B1 | 10/2002 | Koehler |
| 6,467,716 B1 | 10/2002 | Hamilton |
| 6,648,262 B1 | 11/2003 | Huffman |

(Continued)

OTHER PUBLICATIONS

South Chatham Tackle Line Spoolers, http://southchathamtackle.com/Line_Winders.htm, Jul. 9, 2012.
International Search and written opinion in PCT/US2014/037314.

*Primary Examiner* — William E Dondero
(74) *Attorney, Agent, or Firm* — Blank Rome LLP (57) ABSTRACT

Apparatus and methods are described for spooling line on and off of a reel using a turnbuckle mechanism that is adapted to securely fit between two opposing handles on the reel and includes a power driver attachment for quickly turning the tumbuckle mechanism.

16 Claims, 6 Drawing Sheets

(56) References Cited

U.S. PATENT DOCUMENTS

| | | |
|---|---|---|
| 6,702,226 B1 | 3/2004 | Bowling |
| 7,086,622 B1 | 8/2006 | Whaley |
| 7,309,039 B1 | 12/2007 | Stone |
| 7,748,657 B1 | 7/2010 | Goodman |
| 7,793,877 B2 | 9/2010 | Ogino et al. |
| 7,909,280 B1 | 3/2011 | Herrick |
| 8,047,461 B1 | 11/2011 | Slawson |
| 2003/0168546 A1 | 9/2003 | Bankston |
| 2008/0197224 A1 | 4/2008 | Touchstone |
| 2009/0308969 A1 | 12/2009 | Touchstone |

REEL LINE SPOOLER

CROSS REFERENCE TO RELATED APPLICATIONS

This application claims priority based on U.S. Provisional Application Ser. No. 61/824,828 filed May 17, 2013, which is incorporated herein by reference.

FIELD OF THE INVENTION

This invention relates generally to apparatus and methods for removing and replacing line on reels.

BACKGROUND OF THE INVENTION

Without limiting the scope of the invention, its background is described in connection with existing apparatus and methods for winding line on reels and removal of old line, particularly on fishing reels. Line can be removed from a reel by pulling off the old line manually. New line is tied on to the empty reel and the winding mechanism of the reel is manually engaged to reline the reel. This is an effective procedure for many purposes but is time consuming and laborious and does not allow the new line to be put on the reel with controlled tension on the line. Tackle shops will typically provide the service of removing old line from fishing reels and putting new line on the reel using expensive motorized rewinding stations having dedicated motors and associated equipment. For spinning reels the spool will generally be removed from the reel and locked in a winding device that is able to spin the spool and add the new line under tension.

Several tools have also been developed to utilize the motor of a power drill to turn the handle of a reel and spin the spool to quickly add line to the reel. For reels having a single handle, U.S. Pat. Nos. 7,748,657 and 7,909,280 disclose shank mounted cylinders that including a notch or slot to engage the single arm of the reel handle. The shank is insertable into the chuck of an electric drill.

For bait casting and other reel types having a dual arm handles, several tools have been developed that attach to a motor and are able to turn the handle on the reel thus pulling new line onto the reel. An example includes U.S. Pat. No. 7,086,622 where a drill chuck mounted device is provided that includes a cylindrical body with one or more recesses to engage the winding arms of the fishing reel. U.S. Pat. No. 6,015,111 discloses both a plate having two holes to engage the two spaced apart handles on the winding arms of the reel as well as an H shaped drive member having fixed terminal slots for engaging the handles of the winding arms. L shaped winding devices such as that disclosed in US Patent Application Publication No. 2003/0168546 are designed for one arm of the L to fit into the chuck of a drill while the other perpendicular arm rests against a winding arm of the reel. For safe and effective operation a recess in the connector between the two arms must be kept tightly against the center nut of the reel arm.

While certain of the above implements may be useful, invention described herein provides a novel method and apparatus for winding and unwinding line on fishing reels where the winding mechanism can be tightly engaged and remain centered on reels of different sizes such that wobbling of the driver is avoided during high speed winding.

BRIEF SUMMARY OF THE INVENTION

The present invention is directed to an apparatus for winding line on a reel and methods therefore. The apparatus and method of the invention provides a single apparatus that is based on the principal of a turnbuckle to securely fit reels of different dimensions without wobbling of the tool during high speed winding by an electric motor. In certain embodiments the same tool can be used for both unwinding of old line from a reel and replacing the line.

In one embodiment a telescoping turnbuckle line winding apparatus is provided that includes an axially extending central tubular body with first and second opposite end portions having right and left hand threads on their respective inner surfaces and a power driver attachment element positioned on a longitudinal center point of the central tubular body. The apparatus includes a first rod having external left-hand threads disposed around one end of the rod, said threads dimensioned to thread into the first end of the central tubular body, and a pair of open arms outwardly depending from the opposite end of the rod; and a second rod having external right-hand threads disposed around one end of the rod, said threads dimensioned to thread into the second end of the central tubular body, and a pair of open arms outwardly depending from the opposite end of the rod. The power driver attachment element may include an attachment retainer adapted and dimensioned to releaseably secure a power driver to the power driver attachment element such by a magnet or a quick connect coupling mechanism such as a ball and groove mechanism or a snap ring and groove mechanism.

In an embodiment of the invention adapted for taking the line off of a reel, each of the pair of open arms on each of the first and second rods are dimensioned to fit securely against a pair of handles on a reel when the first and second rods are extended to contact the handles of the reel.

The turnbuckle apparatus may be provided in a kit that includes a telescoping turnbuckle line winding apparatus and a power driver adapted and dimensioned to attach to the power driver attachment element, wherein the power driver is adapted and dimensioned to connect between the power driver attachment element and a hand-held electric motor. In some embodiments, the kit includes a line tensioner. One embodiment of a line tensioner includes a pair of spindles each having a first spool end dimensioned to fit a central through-hole of a line supply spool, a spindle body and a second pressure receiving pad end, wherein the spindle body includes an internal bearing assembly that is adapted to allow the spindles to turn freely against the pad ends.

Although the disclosed embodiments are presented in relation to replacing and removing fishing line on fished reels, the apparatus disclosed herein is adaptable to spooling line on other types of reels such as electrical and rope spools.

BRIEF DESCRIPTION OF THE DRAWINGS

For a more complete understanding of the present invention, including features and advantages, reference is now made to the detailed description of the invention along with the accompanying figures:

FIG. 2A depicts an embodiment of a winding arm adapter in relation to a fishing reel. FIG. 2B depicts the wings of the winding arm adapter being extended to approach the winding handles of the reel. FIG. 2C depicts the full extension of the winding arm adapter against the handles of the reel.

DETAILED DESCRIPTION OF THE INVENTION

While the making and using of various embodiments of the present invention are discussed in detail below, it should be appreciated that the present invention provides many applicable inventive concepts which can be employed in a wide variety of specific contexts. The specific embodiments discussed herein are merely illustrative of specific ways to make and use the invention and do not delimit the scope of the invention as defined by the claims.

The following examples are included for the sake of completeness of disclosure and to illustrate the methods of making and using the apparatus of the invention and to present certain exemplary embodiments of the apparatus and method. In no way are these examples intended to limit the scope or teaching of this disclosure.

Figure 1A:
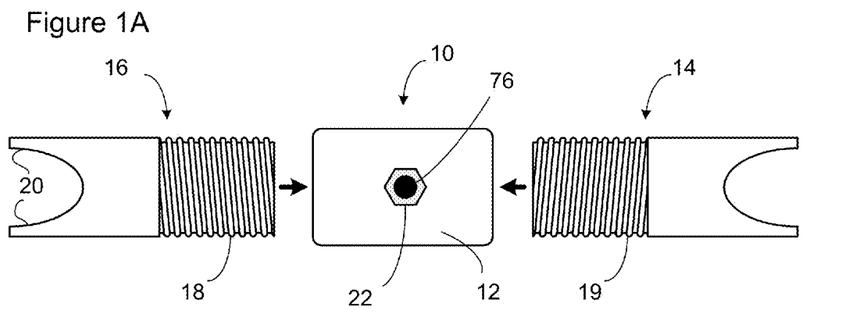
FIGS. 1A-1C illustrate the movement of a turnbuckle mechanism to adjust the length of a winding arm adapter.

In one embodiment, a winding arm adapter is provided that is based on the principal of a turnbuckle. By using this unique design, the adapter can be adjusted to fit snuggly and with central alignment between the dual handles of the handle assembly of reels of various dimensions. One such embodiment is depicted in FIG. 1A. Winding arm adapter 10 includes a central turnbuckle 12 and a first cylindrical arm 14 and second cylindrical arm 16. Each of the first and second arms include a pair of projections 20 on one end and external threads on the opposite end. The threaded portions of the arms have opposite handedness, one is left-handed and one is right handed. Thus, the first arm includes a left-hand threaded portion 18 and the second arm includes a right-hand threaded portion 19. The central turnbuckle 12 has corresponding internal threads, one end having left-hand internal threads and the other end having right-hand internal threads matching those of the respective arms. To assemble the winding arm adapter, the two arms are moved toward the turnbuckle as shown in FIG. 1A by the arrows and the threads of each of the arms are engaged with the internal threads of the turnbuckle. Whether the arms are screwed all the way in or out, when the pair of projections 20 of each arm are placed in contact with the dual handles of a handle assembly, turning of the central turnbuckle will move each of the arms at the same rate but in opposite directions and the center point of the turnbuckle will always remain essentially centered between the handles.

The central turnbuckle 12 is provided with a power driver attachment element 22. As depicted, the driver attachment element is hexagonal but could alternatively be of other geometries such as for example a star 23, square 25 or triangle 27 geometry or any other geometry that will firmly accommodate a driver such as for example a star (hexalobular) driver (23a depicted in FIG. 1E), square driver (25a depicted in FIG. 1F), or triangle driver (27a depicted in FIG. 1G). The power drive attachment element may be a projection from the central turnbuckle or may be a hole in the turnbuckle. In one embodiment, the power driver attachment element is a screw that is screwed into a threaded hole in the turnbuckle at a point midway along the horizontal axis of the turnbuckle. The head of the screw has a geometry that fits a nut driver, such as for example a hexagonal, star or square nut driver. In one embodiment, the power driver attachment element includes an attachment retainer for securing the attachment element to the driver. An example of a suitable attachment retainer is a strong permanent magnet 76 mounted in or on the power driver attachment element 22. Alternatively, as depicted in FIG. 1D, the attachment retainer may be a quick snap connect coupling mechanism examples of which include a snap ring and groove mechanism such as for example including post 29 bearing groove 29a adapted to fit a snap ring bearing 31 on driver 30 or a ball and groove mechanism wherein post 29 bearing groove 29a is adapted to fit balls 33 on driver 30, or other snap connect mechanism.

Figure 1B:
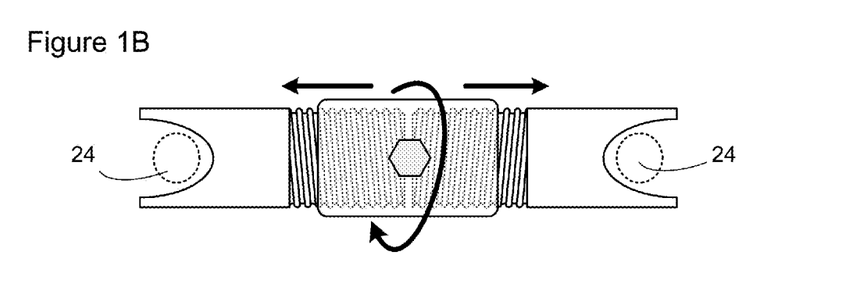
Figure 1C:
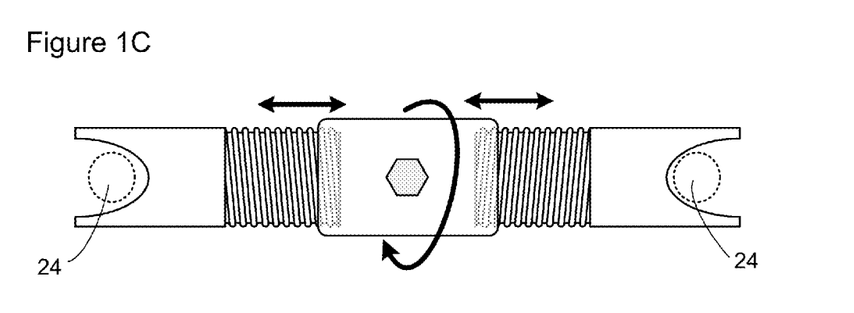
Figure 1D:
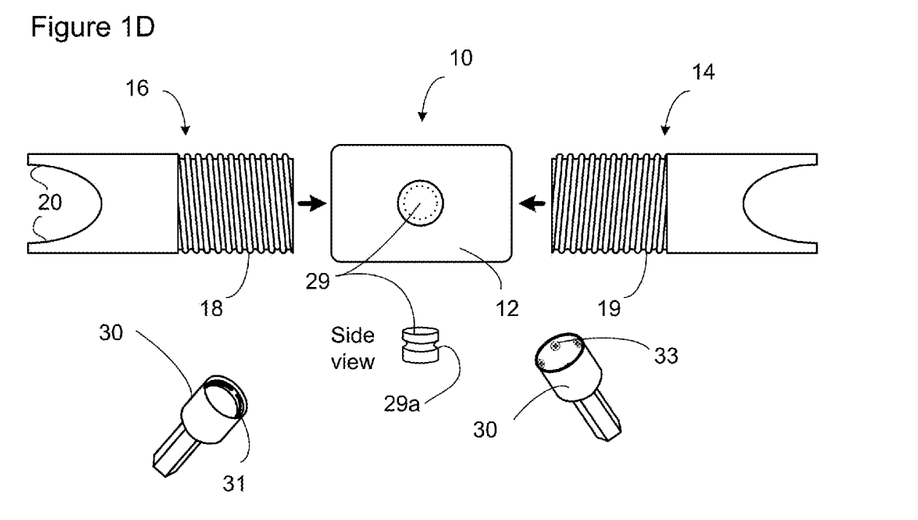
FIG. 1D shows an embodiment with a quick connect power driver attachment element.
Figure 1E:
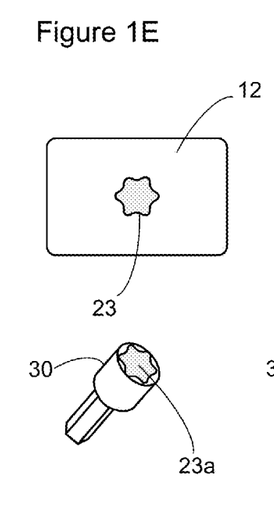
FIG. 1E shows an embodiment with a power driver attachment element configured to fit a star nut driver.
Figure 1F:
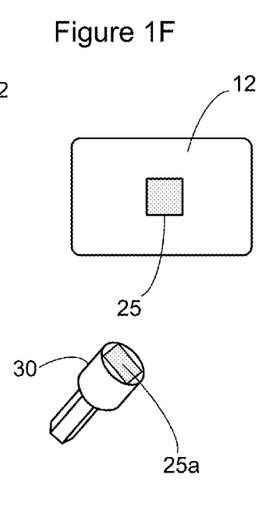
FIG. 1F shows an embodiment with a power driver attachment element configured to fit a square nut driver.
Figure 1G:
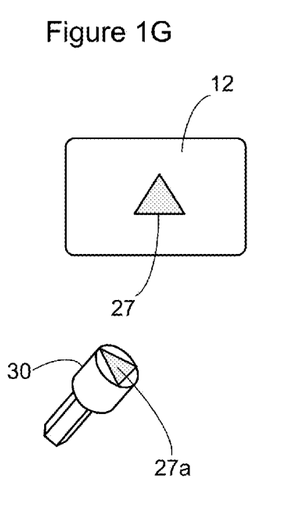
FIG. 1G shows an embodiment with a power driver attachment element configured to fit a triangular nut driver.

FIGS. 1B and C demonstrate the ability of a single winding arm adapter assembly to fit reels having different handle winder spacings. In FIG. 1B, the arms 14 and 16 have been screwed in to a maximum extent to fit tightly between the handles 24 of a relatively narrow handle assembly while in FIG. 1C, a tight fit is obtained between further spaced handles using the same winding arm adapter assembly.

FIG. 2A depicts the placement of an embodiment of a turnbuckle winding arm adapter 10 being placed between the handles 24 of reel 26. In FIG. 2B, central turnbuckle 12 is rotated around its short axis to evenly extend arms 14 and 16 against handles 24 until they are tight against the handles as depicted in FIG. 2C.

Figure 3:
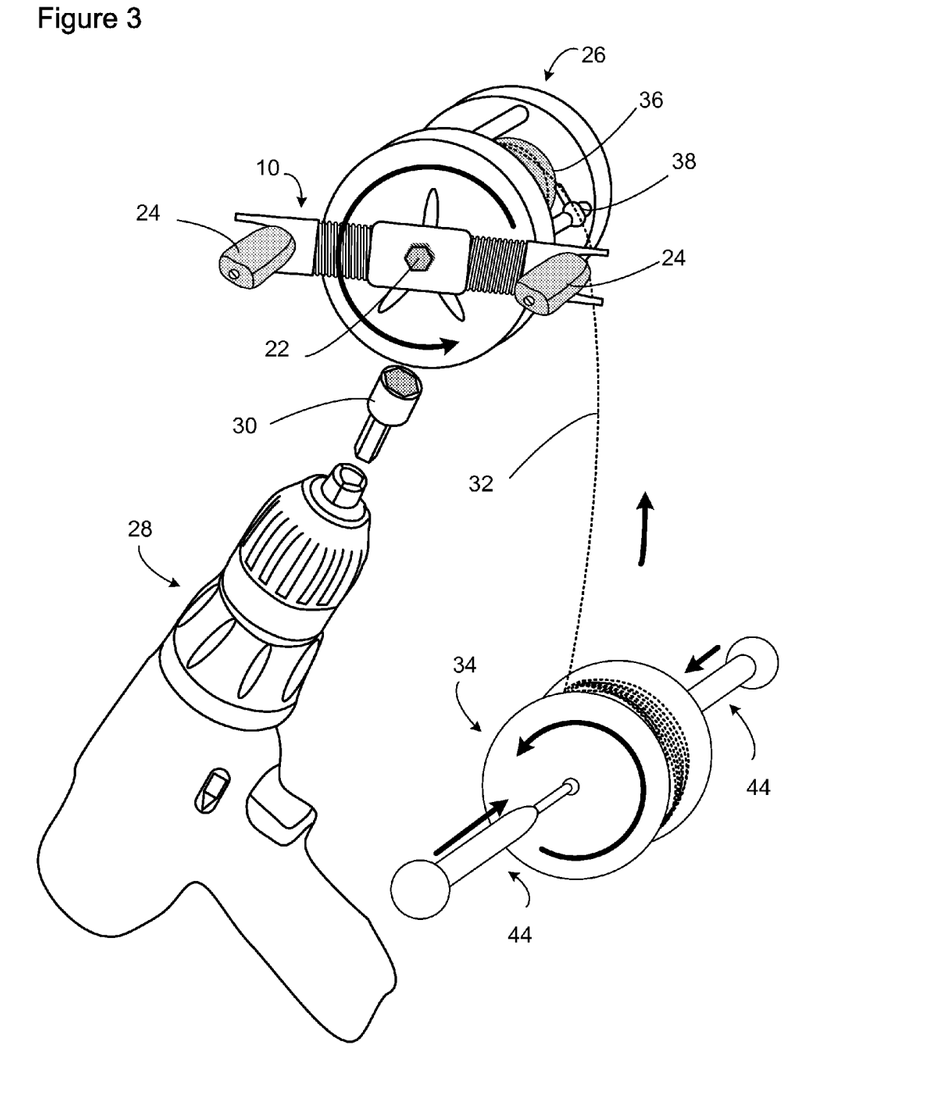
FIG. 3 illustrates an embodiment including a winding motor, a winding arm adapter and a line spool tensioner in relation to a fishing reel and line spool.

FIG. 3 depicts winding arm adapter 10 firmly in position between the handles 24 of reel 26. In operation, a power driver such as is provided by electric drill 28 is releaseably affixed to the power driver attachment element 22 of the winding arm adapter via nut driver 30. Line 32 is provided from line supply spool 34 and tied onto reel spool 36. The motor is engaged and the winding arm adapter assembly 10 causes the reel handle assembly to spin as shown with the arrow over the reel and line is pulled evenly onto the reel through the action of the line winder guide 38.

Also depicted in FIG. 3 is an embodiment of an optional line tensioner control. In the depicted embodiment, the tensioner is a supply line spool tensioner that comprises a pair of spindles 44 that are adapted to hold the spool 34 and if desired apply inward pressure to the spool 34 and thus apply tension to the line as it is pulled onto the reel.

Figure 4:
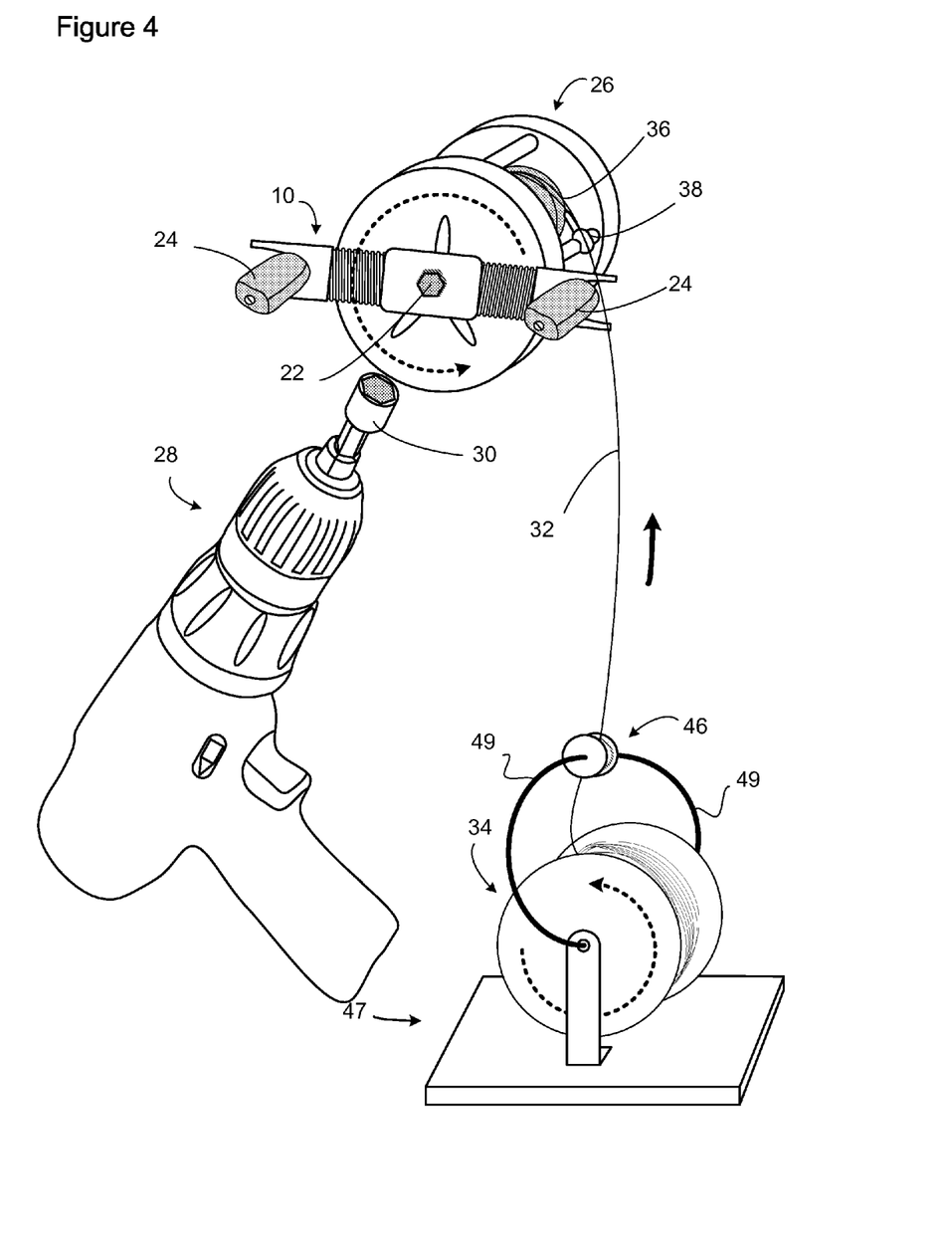
FIG. 4 illustrates an alternative embodiment including a line tensioner in relation to a fishing reel and line spool.

An alternative line tensioner control embodiment is depicted in FIG. 4. Line tensioner 46 applies pressure directly to the line 32 as it comes off of spool 34. If desired the line tensioner 46 can be mounted to spool holder assembly 47 via tensioner holding arms 49. Spool holder assembly 47 may be clamped to a solid support such as a table or bench (not shown) if desired.

Certain line tensioners have been described in the past. In U.S. Pat. No. 4,948,059, a tensioner assembly is provided that mounts in a vise and utilizes a crank mechanism to squeeze the sides of the line supply spool. In U.S. Patent Publication No. 2009/0308969 a tensioner is provided that can be hooked on a door knob and applies line pressure by a spring operated bar that impinges on the opposing rails of the line spool. Commercial line winders with tensioners are available that include a stand that holds the spool and a tensioner together with a motor for turning the reel spool. Such devices will not fit in a tackle box and may not be readily available when needed.

Figure 5A:
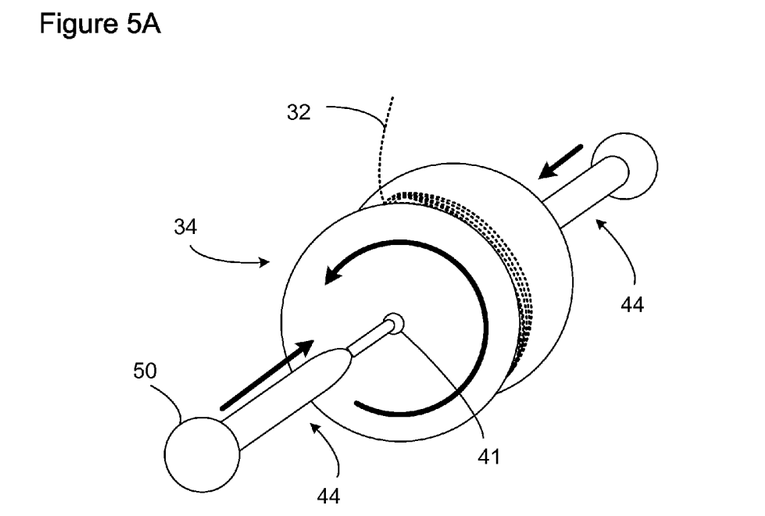
FIG. 5A illustrates an embodiment of the line spool tensioner of FIG. 3 in tangential view.
Figure 5B:
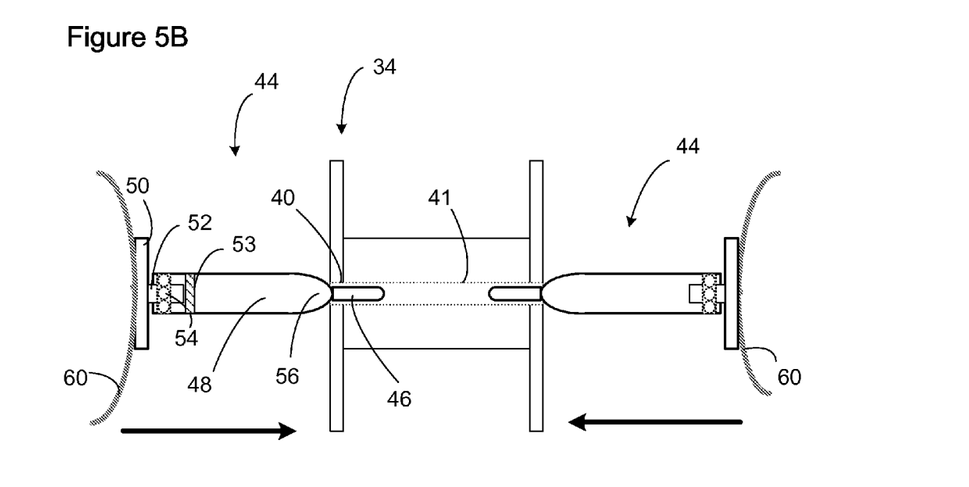
FIG. 5B illustrates the line spool holder of FIG. 5A in cross section.

In contrast, an embodiment of a line spool tensioner provided herein and depicted in FIGS. 5A and B is conveniently packed in a tackle box. As shown in FIG. 5B, the line spool tensioner includes a pair of spindles 44 that include a narrow diameter tip cylinder 46 that is dimensioned to fit into the central through-hole of a line supply spool. Tip 46 is affixed to tapered portion 56 of larger diameter spindle body 48. Spindle body 48 is dimensioned such that it cannot completely enter the central through hole of a line supply spool. On the end opposite to the narrow diameter tip cylinder, spindle body 48 includes an internal bearing assembly 54 that is dimensioned to engage rod 52. Rod 52 is affixed to and depends outwardly from and perpendicular to the center of pad 50. When rod 52 is inserted into bearing assembly 54, the spindle is able to turn freely against pad 50. In operation, the two spindles are placed such that each narrow diameter tip cylinder 46 enters the central through-hole 41 of spool 34. The spindles and spool are then engaged as a unit between a source of inwardly depending pressure. In one example the source of inwardly depending pressure is the knees 60 of an individual. Tension can be applied to the spool by pressing the knees together thus causing the tapered portion 56 of spindles 44 to impinge against the edges of the central through-hole 41 of the line supply spool. Alternatively, spindle body 48 may include an internal brake pad 53 that slows the action of rod 52 when inward pressure is applied.

Figure 6:
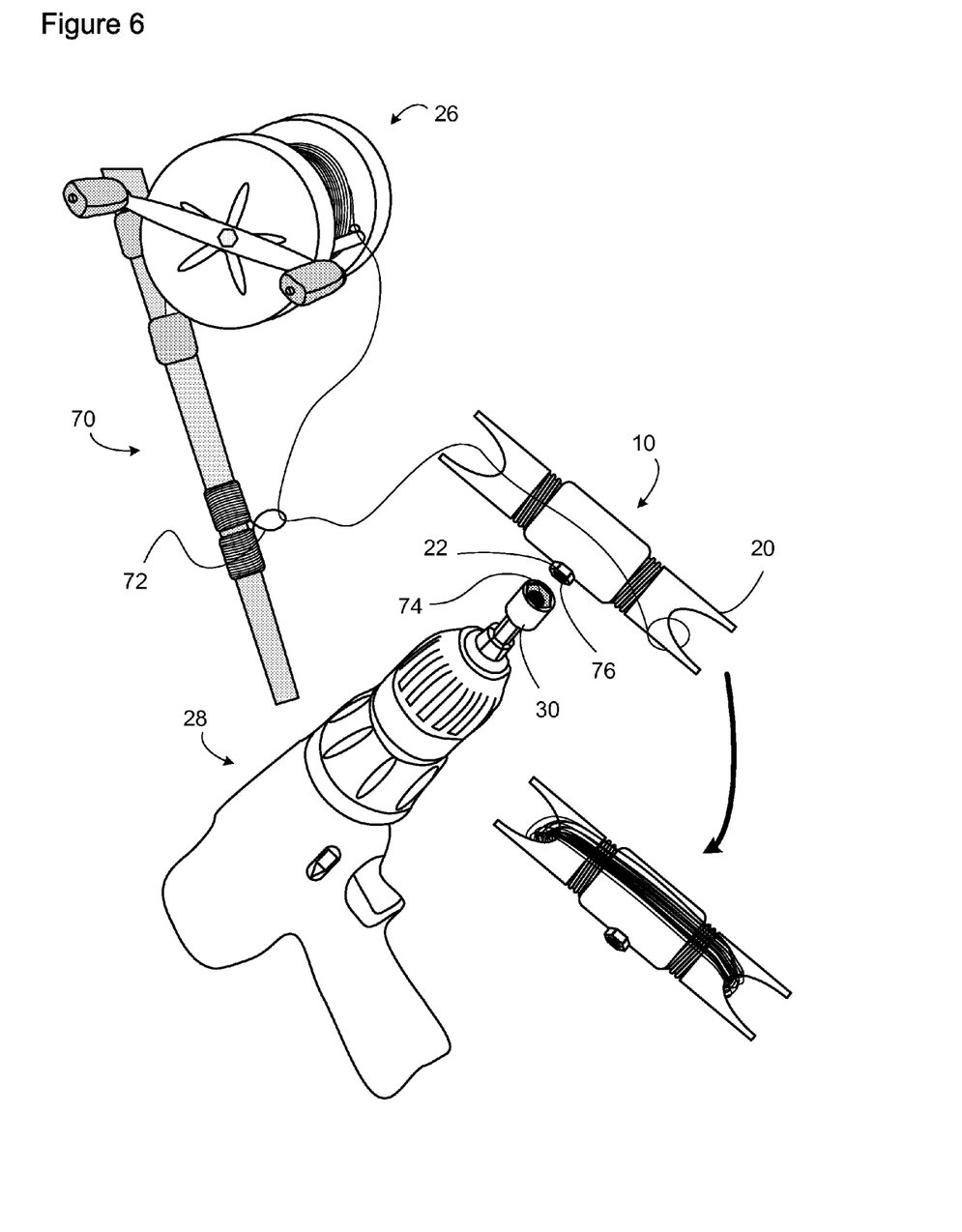
FIG. 6 illustrates an embodiment in which the winding arm adapter is utilized to remove spent line from a reel.

The winding arm adapter disclosed herein can also be utilized to remove spent line from a reel as depicted in FIG. 6. As with putting line on the reel, if desired, line may be taken off the reel without removing reel 26 from the rod 70. For the purpose of taking line off of the reel, winding arm adapter 10 is not placed between the handles of the reel but is attached only to a motor, such as electric drill 28. As the winding arm adapter 10 is spun by the action of the electric motor, line is pulled off reel 26 and onto the winding arm adapter 10. Upon complete removal of line from the reel, the spent line is conveniently cut en masse and removed from the winding arm adapter. In one embodiment, as shown in FIG. 6, line is removed from the reel while still mounted on the fishing rod and the line is directed through line guide 72 and looped around one arm 20 of the winding arm adapter 10. Directing the line though a stationary guide such as line guide 72 centralizes the line coming off the reel for turning onto the winding arm adapter. In one embodiment, attachment is provided between the motor and winding arm adapter 10 by inclusion of a first strong permanent magnet 74 in the female receiver of nut driver 30 and a second strong permanent magnet 76 mounted in power driver attachment element 22. Currently available strong permanent magnets include rare-earth magnets such as neodymium magnets.

All publications, patents and patent applications cited herein are hereby incorporated by reference as if set forth in their entirety herein. While this invention has been described with reference to illustrative embodiments, this description is not intended to be construed in a limiting sense. Various modifications and combinations of illustrative embodiments, as well as other embodiments of the invention, will be apparent to persons skilled in the art upon reference to the description. It is therefore intended that the appended claims encompass such modifications and enhancements.

I claim:

1. A telescoping turnbuckle line winding apparatus comprising:
    an axially extending central tubular body with first and second end portions having right and left hand threads on their respective inner surfaces and a power driver attachment element positioned on a longitudinal center point of the axially extending central tubular body;
    a first rod having external left-hand threads disposed around one end of the first rod, said threads dimensioned to thread into the first end portion of the central tubular body, and a pair of open arms outwardly depending from an opposite end of the first rod; and
    a second rod having external right-hand threads disposed around one end of the second rod, said threads dimensioned to thread into the second end portion of the central tubular body, and a pair of open arms outwardly depending from the opposite end of the second rod.

2. The telescoping turnbuckle line winding apparatus of claim 1, wherein the power driver attachment element includes an attachment retainer adapted and dimensioned to releaseably secure a power driver to the power driver attachment element.

3. The telescoping turnbuckle line winding apparatus of claim 2, wherein the attachment retainer is a magnet.

4. The telescoping turnbuckle line winding apparatus of claim 2, wherein the attachment retainer is a quick connect coupling mechanism.

5. The telescoping turnbuckle line winding apparatus of claim 4, wherein the quick connect coupling mechanism is selected from the group consisting of: a ball and groove mechanism, and, a snap ring and groove mechanism.

6. The telescoping turnbuckle line winding apparatus of claim 1, wherein each of the pair of open arms on each of the first and second rods are dimensioned to fit securely against a pair of handles on a reel when the first and second rods are extended to contact the handles of the reel.

7. A kit comprising:
    telescoping turnbuckle line winding apparatus comprising:
        an axially extending and internally threaded central tubular body and two outwardly depending rods that screw evenly into each opposite end of the central tubular body by a turnbuckle mechanism when the rod ends are secured and the central tubular body is turned, wherein each rod has a pair of open arms outwardly depending from the rods when the rods are engaged into the threads of the central tubular body and wherein the central tubular body includes a power driver attachment element positioned on a longitudinal center point of the tubular body; and
    a power driver adapted and dimensioned to attach to the power driver attachment element, wherein the power driver is adapted and dimensioned to connect between the power driver attachment element and an electric motor.

8. The kit of claim 7, wherein the power driver attachment element projects from the surface of the central tubular body.

9. The kit of claim 7, wherein the power driver attachment element is recessed in the surface of the central tubular body.

10. The kit of claim 7, wherein the power driver attachment element and the power driver are adapted to fit together and have a matching geometry selected from the group consisting of a hexagonal, star, square or triangular geometry.

11. The kit of claim 7, wherein the power driver attachment element and the power driver include attachment retainers.

12. The kit of claim 11, wherein the attachment retainers are permanent magnets that are adapted to releaseably secure the power driver attachment element and the power driver to each other.

13. The kit of claim 12, wherein the pair of spindles are adapted and dimensioned to secure a line supply spool between a set of knees of an individual and control a rate of spool rotation as variable pressure is applied to the pads by the knees of the individual.

14. The kit of claim 11, wherein the attachment retainers are quick connect coupling mechanisms selected from the group consisting of ball and groove mechanisms, and snap ring and groove mechanisms.

15. The kit of claim 7, further comprising a line tensioner.

16. The kit of claim 7 further comprising a line tensioner comprising a pair of spindles each having a first spool end dimensioned to fit a central through-hole of a line supply spool, a spindle body and a second pressure receiving pad end, wherein the spindle body includes an internal bearing assembly that is adapted to allow the spindles to turn freely against the pad ends.

\* \* \* \* \*

UNITED STATES PATENT AND TRADEMARK OFFICE
CERTIFICATE OF CORRECTION

PATENT NO. : 9,918,457 B2
APPLICATION NO. : 14/891070
DATED : March 20, 2018
INVENTOR(S) : James L. Masten It is certified that error appears in the above-identified patent and that said Letters Patent is hereby corrected as shown below:

In the Specification

Under Detailed Description of the Invention:
At Column 4, Line number 16, delete the word - "bearing"

Signed and Sealed this
Twenty-fourth Day of April, 2018

Andrei Iancu
*Director of the United States Patent and Trademark Office*